H. L. BENNETT.
Corn-Coverer.
No. 29,351.
Patented July 31, 1860.
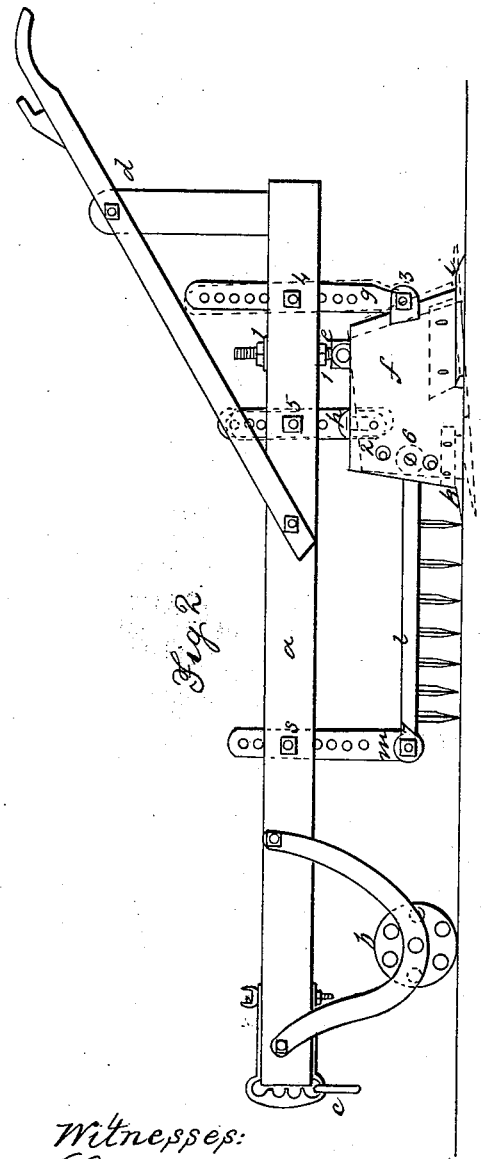
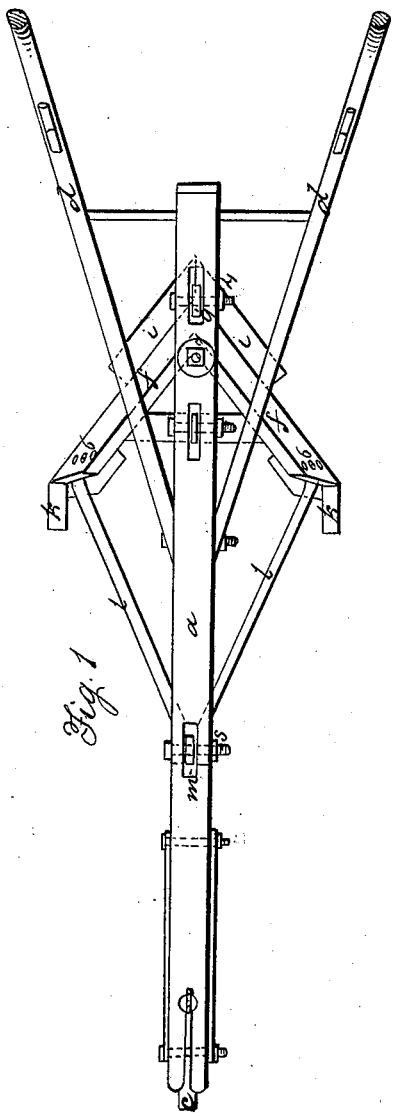
Witnesses:
Inventor:

UNITED STATES PATENT OFFICE.

HARMON L. BENNETT, OF LONG BRANCH, NEW JERSEY.

IMPROVEMENT IN MACHINES FOR COVERING POTATOES.

Specification forming part of Letters Patent No. 29,351, dated July 31, 1860.

*To all whom it may concern:*

Be it known that I, HARMON L. BENNETT, of Long Branch, in the county of Monmouth and State of New Jersey, have invented and made a certain new and useful Machine for Covering Potatoes, Beans, Corn, &c.; and I do hereby declare that the following is a full, clear, and exact description of the nature of my said invention, reference being had to the annexed drawings, making part of this specification, wherein—

Figure 1 is a plan, and Fig. 2 is a side elevation, of my said machine.

Similar letters denote the same parts.

After corn, potatoes, pease, or beans have been planted in hills or rows it has been usual to throw the earth from each side up onto the rows by a plow traveling first on one side and then on the other of each row. This is a tedious operation and the covering is irregular, being deeper in some places than in others, and the surface is left in an uneven condition.

My said invention consists in an arrangement of double mold-board adjustable to any desired angle with the beam, so that the earth is gathered into a row from two furrows and covers the patatoes, corn, pease, beans, or other articles planted to any desired depth, according to the inclination of the covering mold-boards. I make use of a harrow, in combination with this covering mold-board, to loosen the earth and rake any stubble or stones into the furrows. By reversing the mold-board on the beam I am enabled to throw the earth more or less from the furrow onto the two adjoining rows for the purposes of cultivating growing crops.

In the drawings, $a$ is the beam, of any usual or convenient size and shape.

$b$ is the front wheel, which may or may not be adjustable.

$c$ is an ordinary clevis by which the draft is regulated, and the same may be set for the horse to walk in either the furrow or the row, according to the material planted.

$d\ d$ are the handles by which the machine is guided.

$f$ is a double mold-board, attached by the center bolt, $e$, that forms a joint on which the said double mold-board can be turned into a more or less inclined position, as indicated by the red lines.

$1\ 1$ are nuts by which the mold-board $f$ can be adjusted vertically with accuracy.

$g\ h$ are links connected at 2 and 3 to the mold-board $f$, and pass through mortises in the beam $a$, 4 and 5 being bolts that pass through perforations in said links and regulate the point at which the mold-board $f$ is sustained in a horizontal or inclined position.

$k\ k$ are shares attached to the forward ends of the mold-board, and $i$ is a share at the apex of said mold-board.

It will now be evident that this machine, when set in an inclined position, as seen by the red lines, Fig. 2, will gather up the earth from the furrows and leave the same in any desired condition—that is to say, the more the triangular mold-board $f$ is inclined the deeper the articles planted will be covered, for the earth will be scraped up by $k\ k$ from the furrows and escape under $i$ in the form of a ridge or row, the surfaces being smooth and inclined up over the substances planted.

The harrow $l$ is attached at the front end by the bar $m$ at 7, and said bar $m$ passes through the beam $a$, and 8 is a bolt to regulate the height of said harrow at the forward end, and at the back ends the harrow is connected by the bolts 6 in one set of the holes of the mold-board $f$. This harrow, being of a triangular form, tends to rake off any foreign substance before the article planted is covered.

By reversing the mold-board $f$, as before indicated, so that the share $i$ comes toward the front, my machine can be used for covering corn or other articles as they grow, the same being a very efficient substitute for hoeing, as the ground will be left in a very even and handsome condition.

What I claim, and desire to secure by Letters Patent, is—

1. The triangular mold-board $f$, provided with the shares $k\ k$ and $i$, and adjustable relatively to the beam $a$ by the bars $g\ h$, substantially as and for the purposes set forth.

2. In combination with the aforesaid triangular mold-board, the harrow $l$, attached to the bar $m$ and to said mold-board $f$, in the manner and for the purposes specified.

In witness whereof I have hereunto set my signature this 16th day of May, 1860.

HARMON L. BENNETT.

Witnesses:
 LEMUEL W. SERRELL,
 THOS. GEO. HAROLD.